Aug. 4, 1931.  F. G. L. BOYER  1,817,476
TOTALIZING DEVICE
Filed April 1, 1922   12 Sheets-Sheet 1
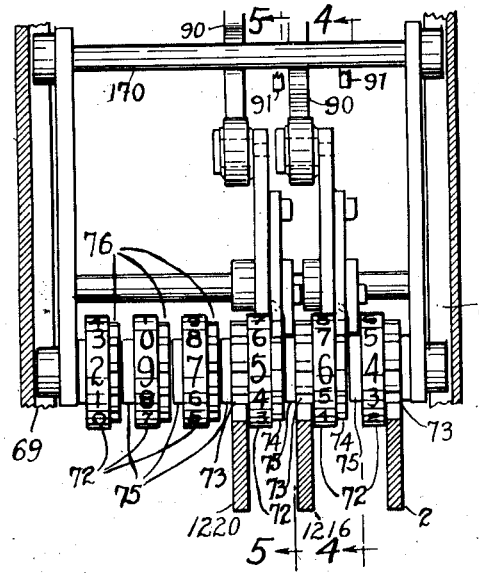
Fig. 3.
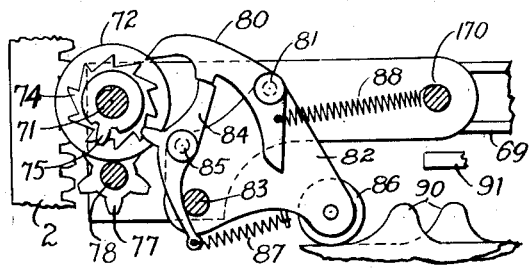
Fig. 4.
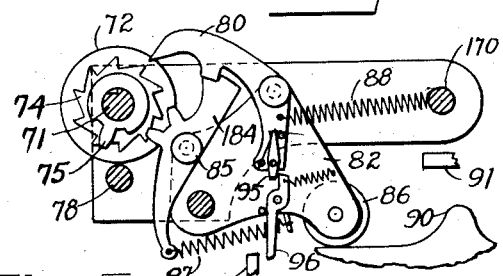
Fig. 5.
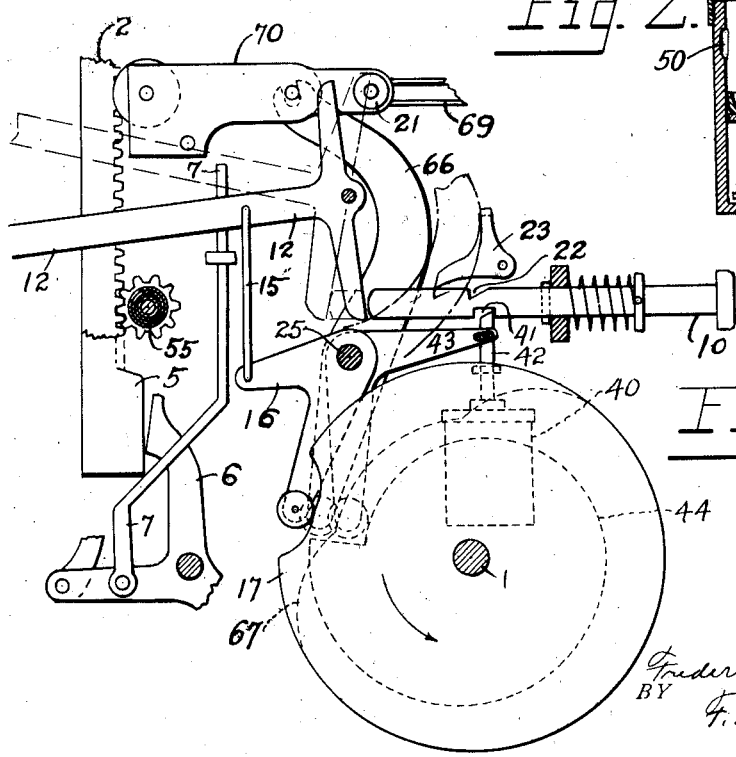
Fig. 2.
Fig. 1.
INVENTOR.
Frederick G. L. Boyer,
BY
F. K. Garrett
ATTORNEY.

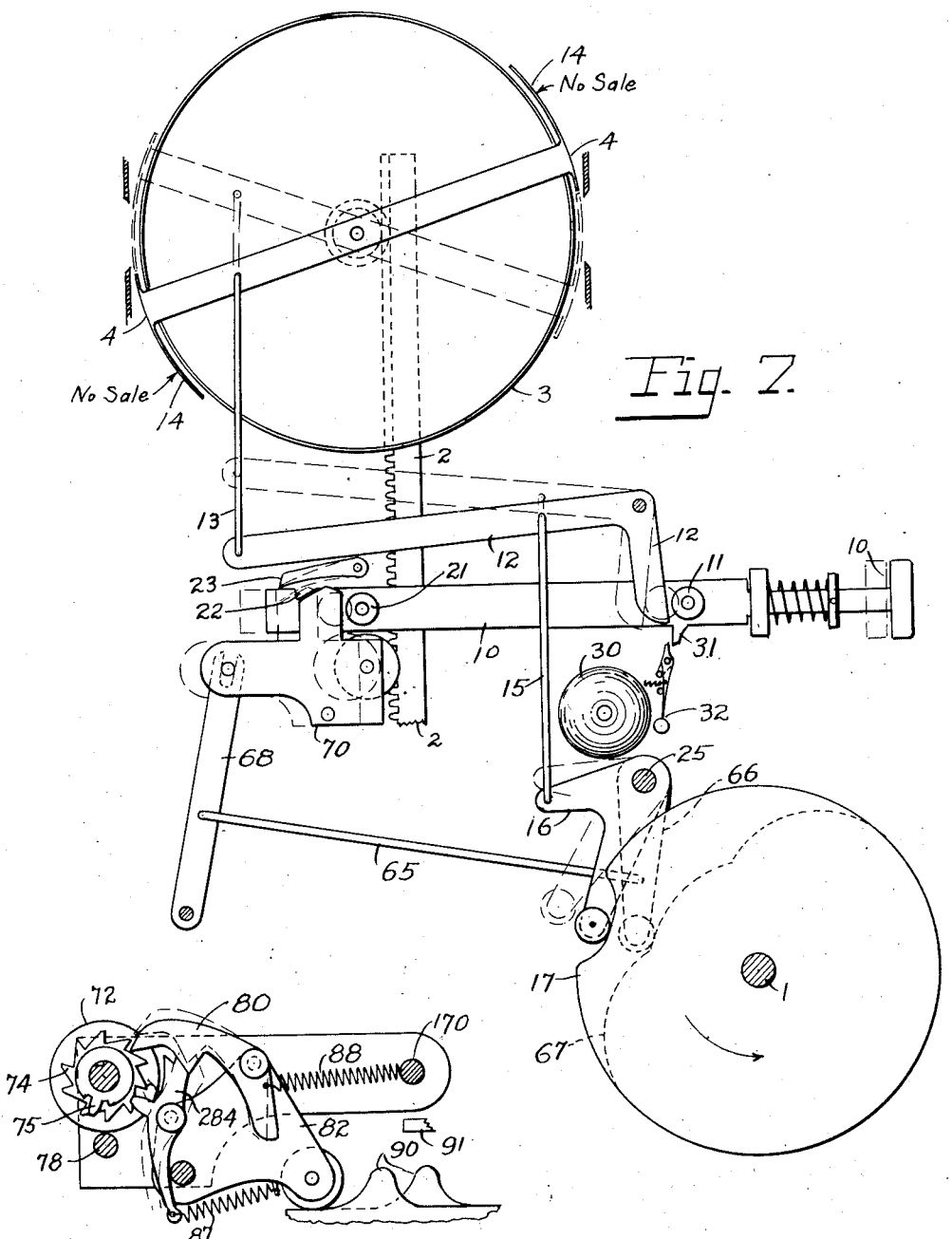

Aug. 4, 1931.    F. G. L. BOYER    1,817,476
TOTALIZING DEVICE
Filed April 1, 1922    12 Sheets-Sheet 3

INVENTOR.
BY Frederick G. L. Boyer
F. K. Fassett,
ATTORNEY.

Aug. 4, 1931. F. G. L. BOYER 1,817,476
TOTALIZING DEVICE
Filed April 1, 1922 12 Sheets-Sheet 4
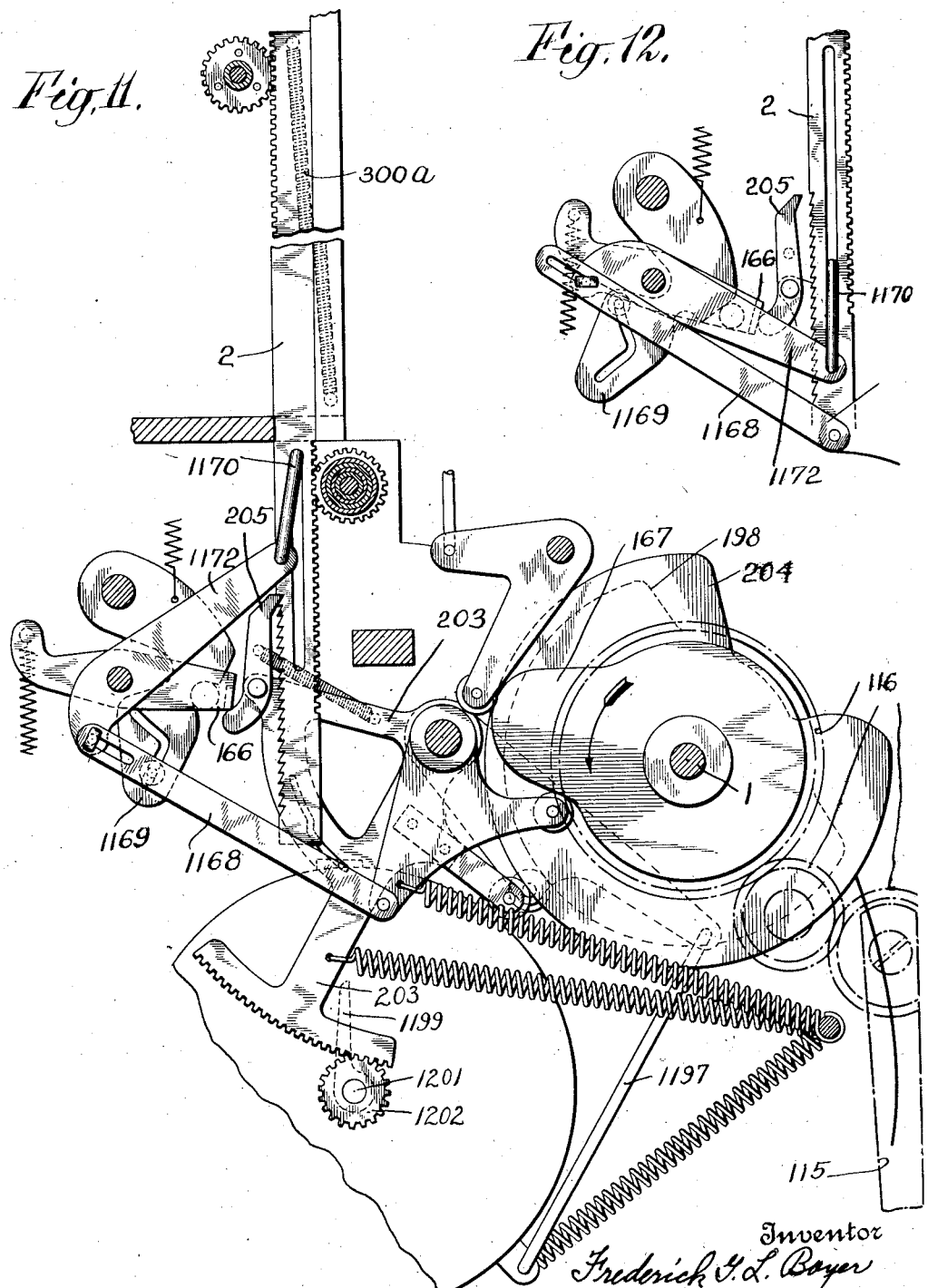

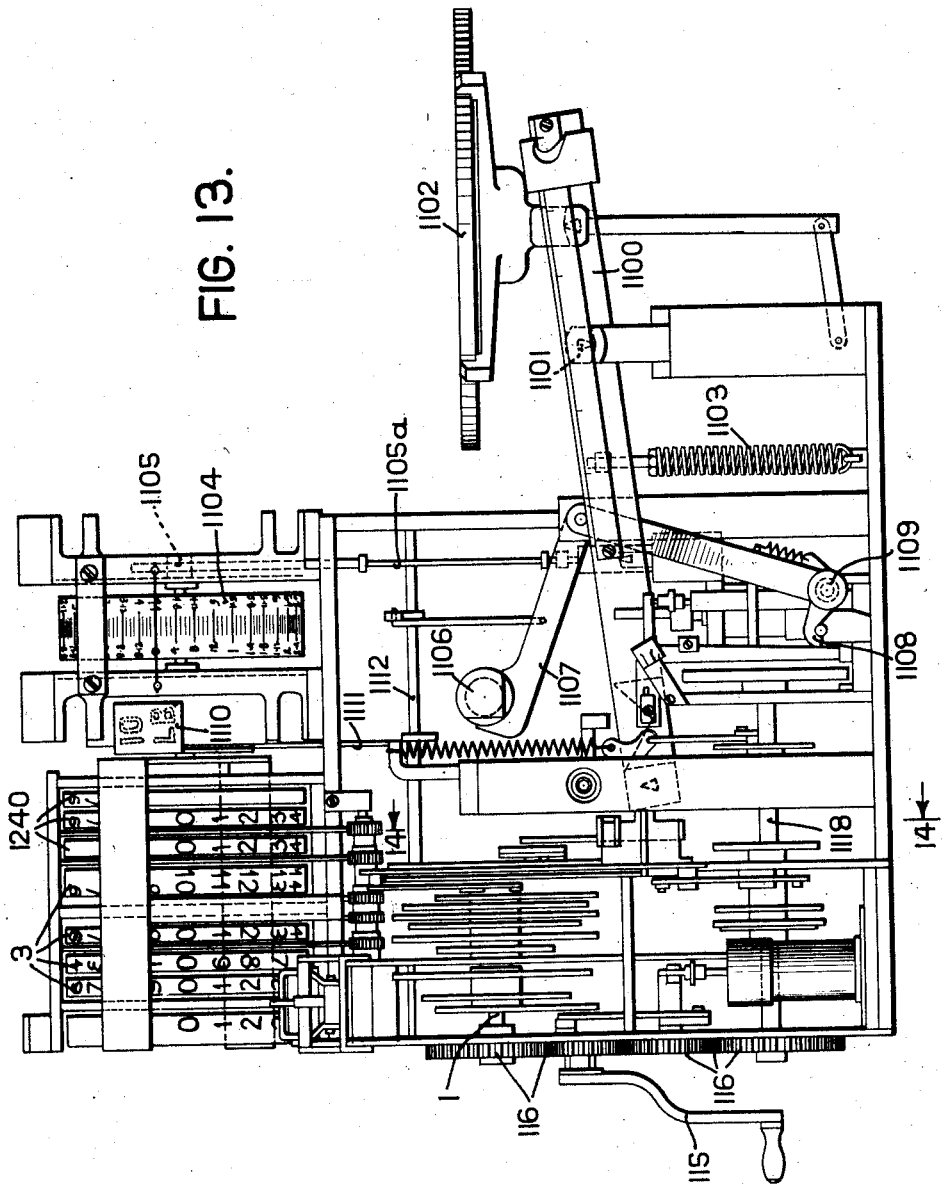

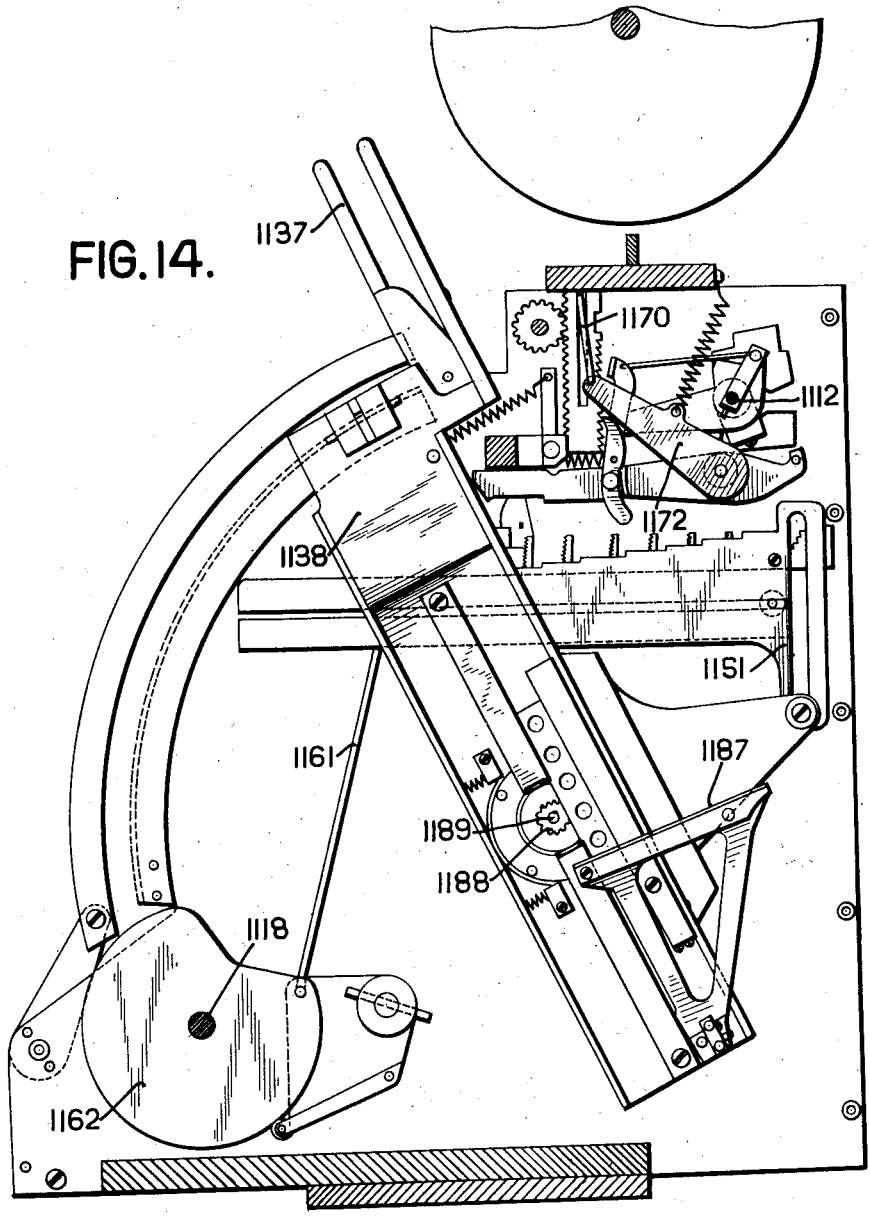

Aug. 4, 1931.  F. G. L. BOYER  1,817,476
TOTALIZING DEVICE
Filed April 1, 1922  12 Sheets-Sheet 7

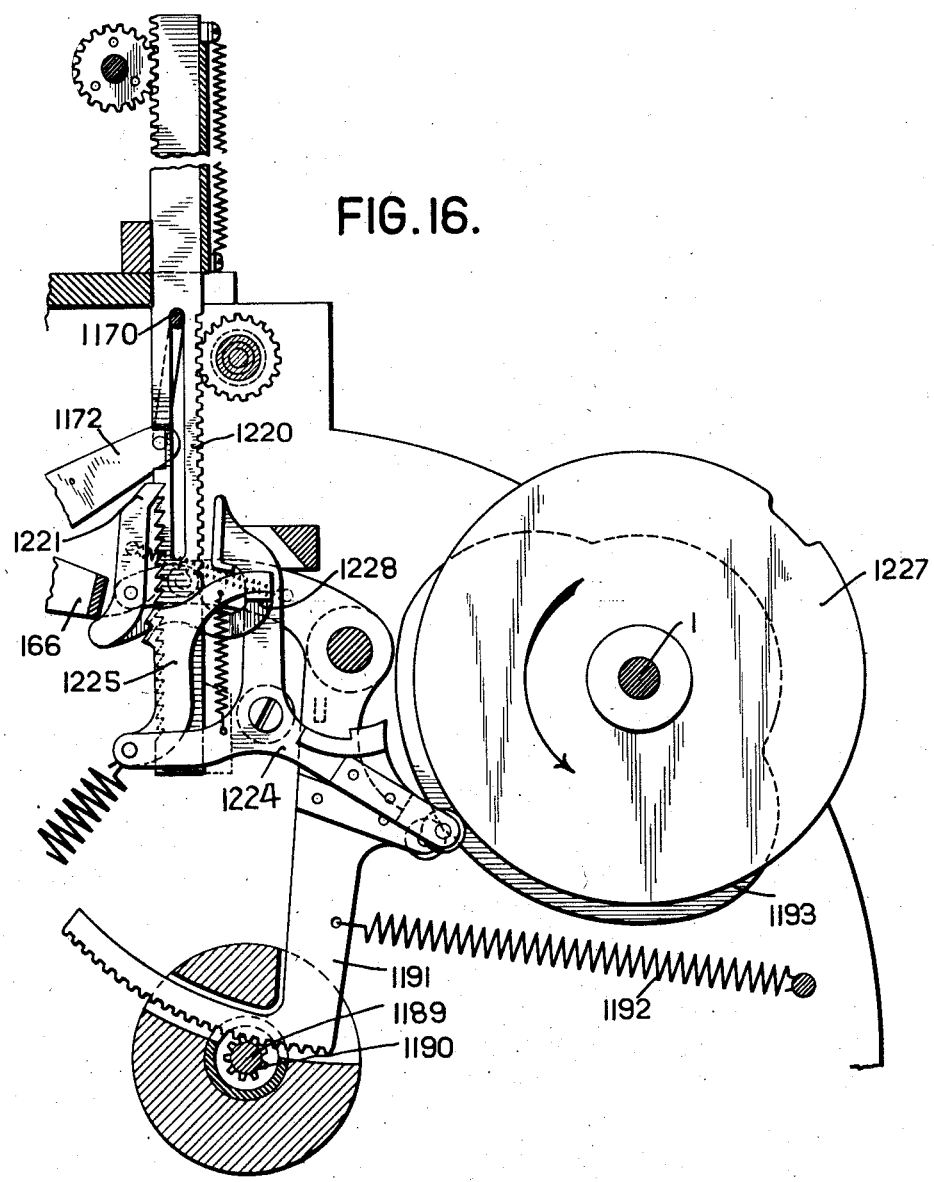

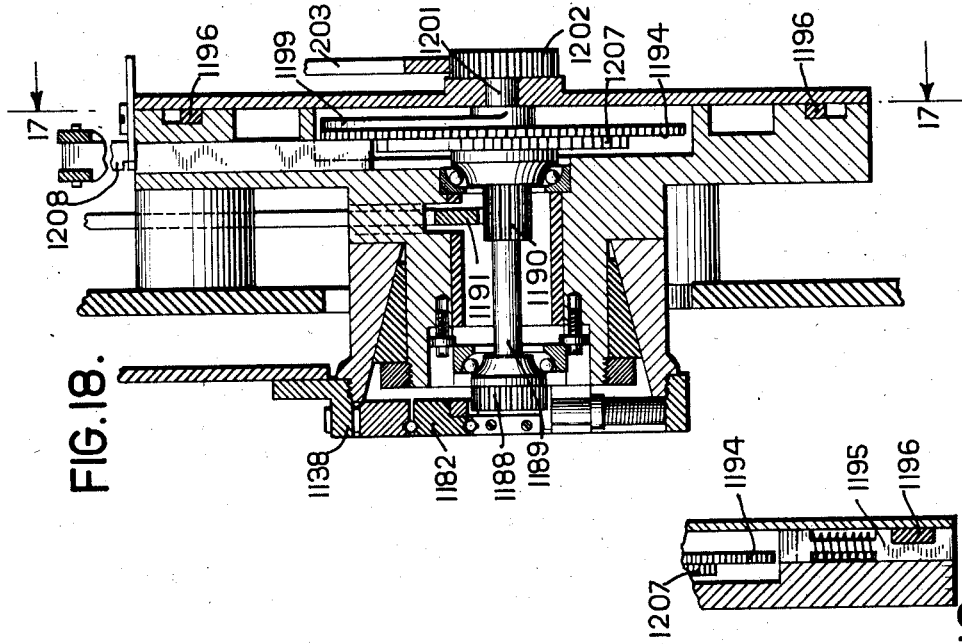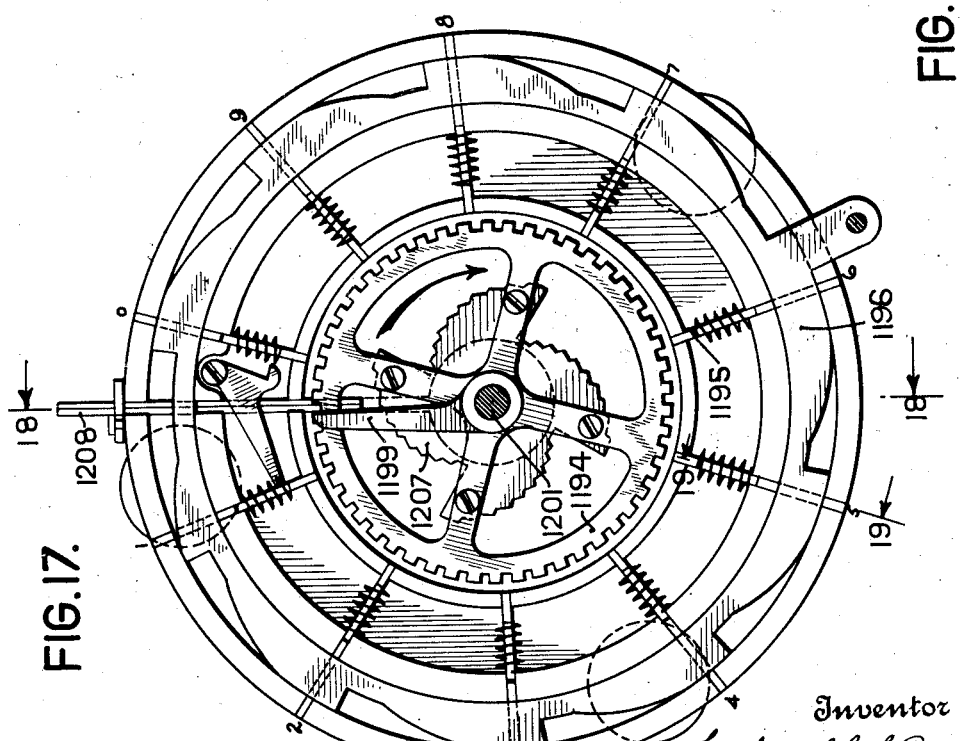

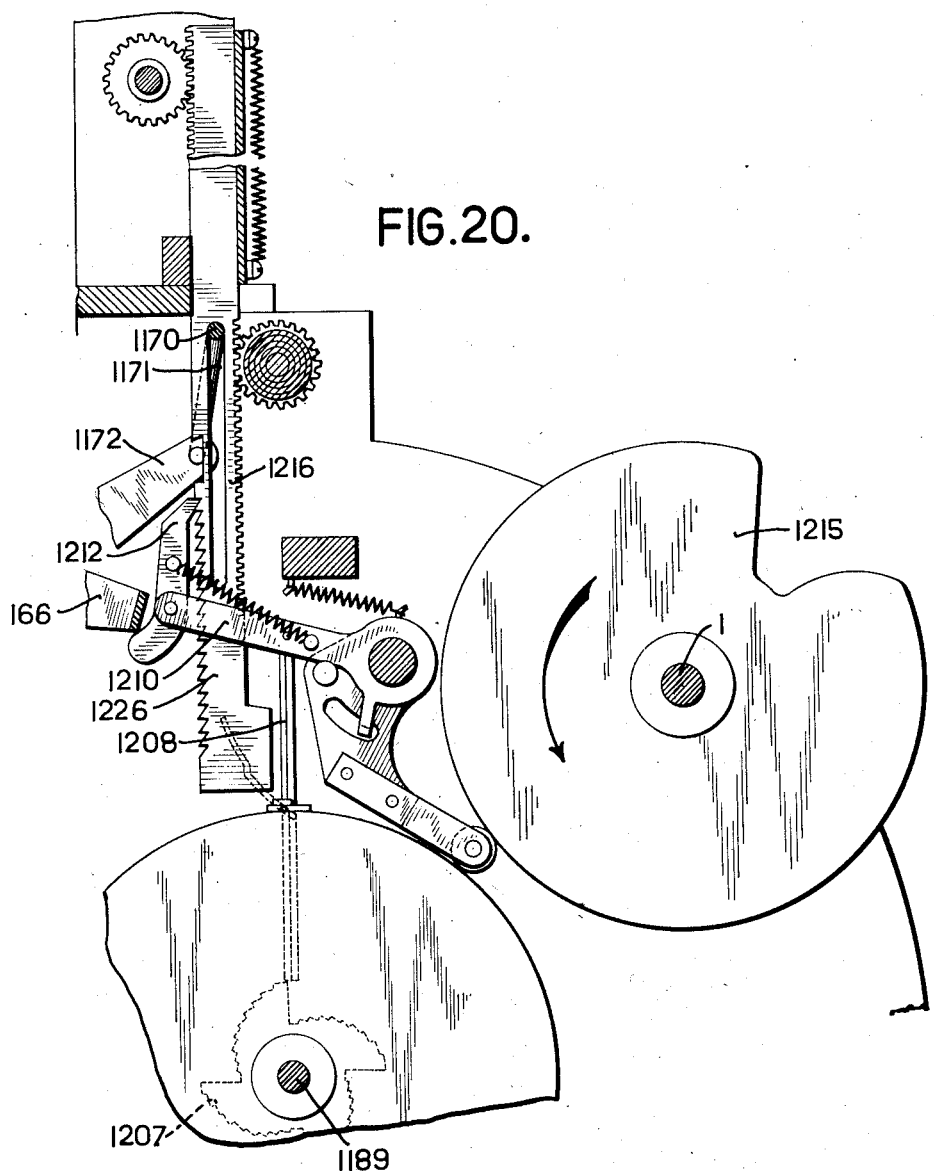

Aug. 4, 1931.  F. G. L. BOYER  1,817,476
TOTALIZING DEVICE
Filed April 1, 1922    12 Sheets-Sheet 11
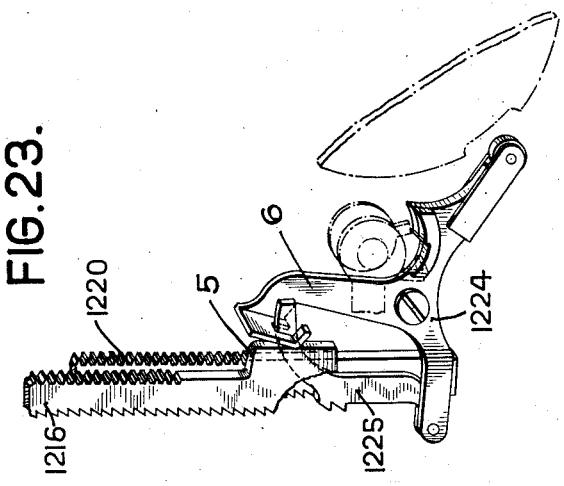
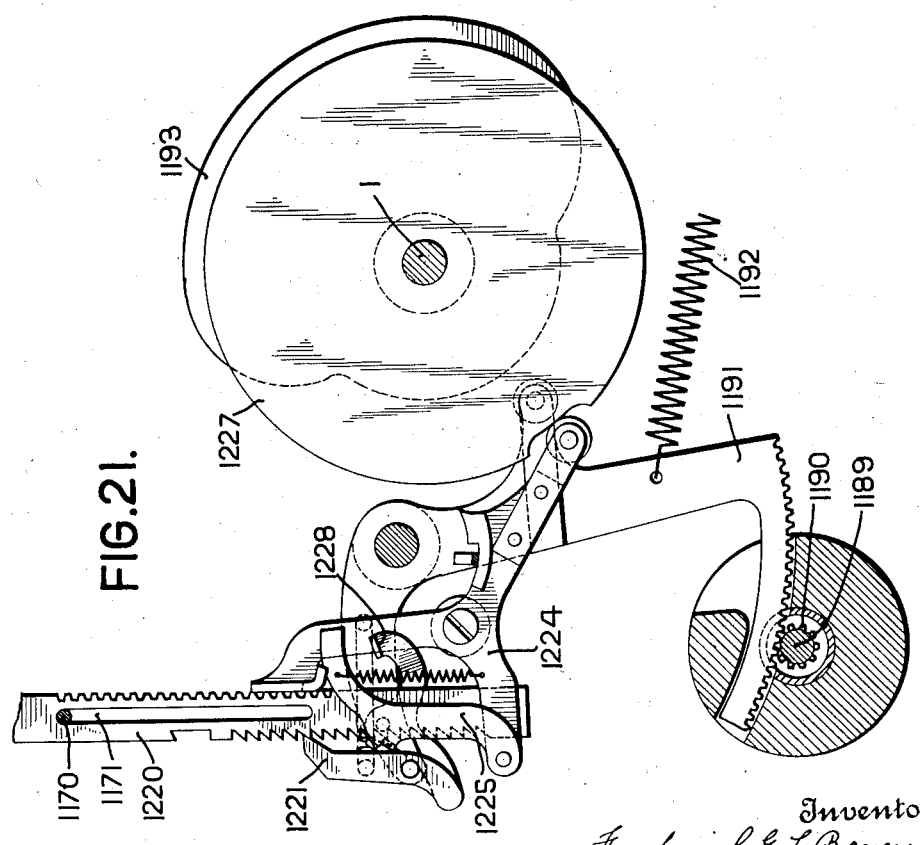
Inventor
Frederick G. L. Boyer
By his Attorney
W. M. Wilson

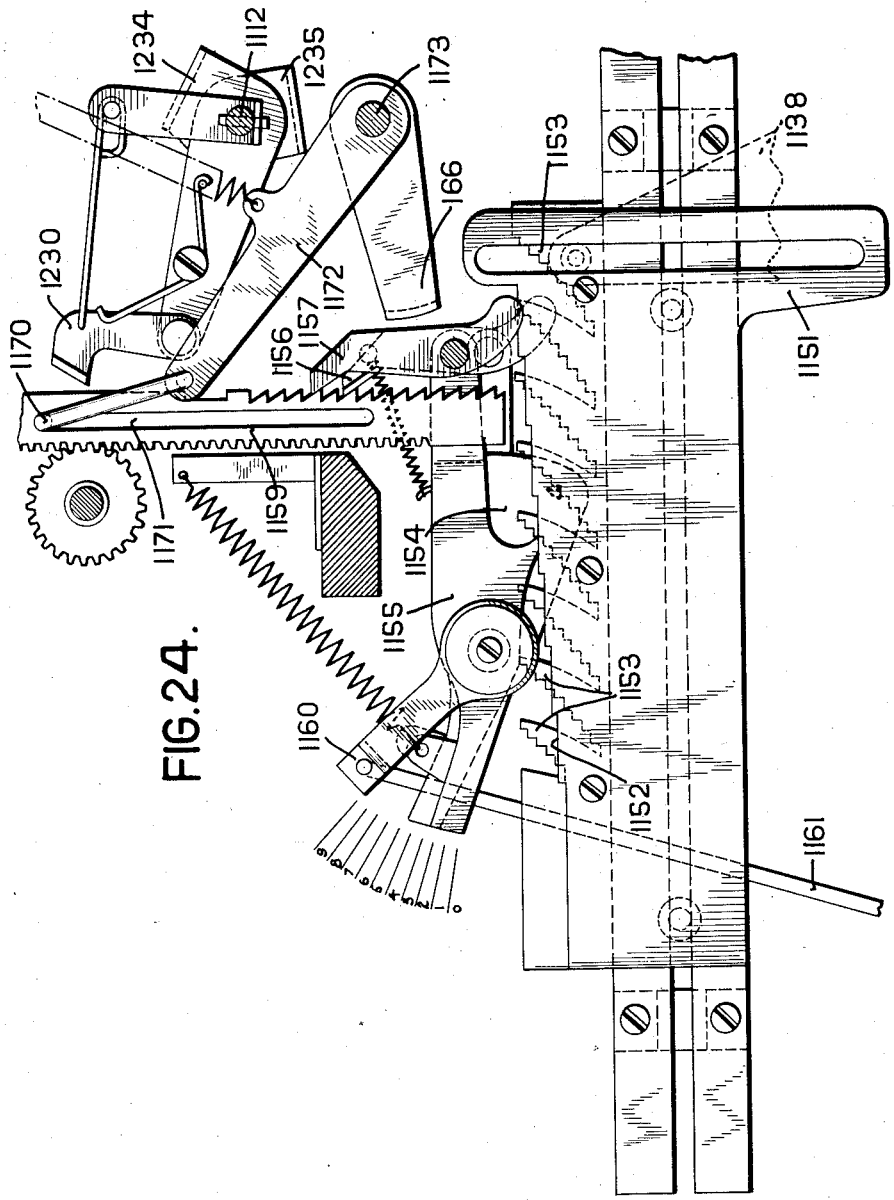

Patented Aug. 4, 1931

1,817,476

UNITED STATES PATENT OFFICE

FREDERICK G. L. BOYER, OF DAYTON, OHIO, ASSIGNOR TO DAYTON SCALE COMPANY, OF DAYTON, OHIO, A CORPORATION OF NEW JERSEY

TOTALIZING DEVICE

Application filed April 1, 1922. Serial No. 548,744.

The present invention relates to an improvement on the devices shown in the co-pending application of Boyer and Boyer S. N. 534,038 filed Feb. 4, 1922 now issued as U. S. Patent No. 1,584,508, May 11, 1926. In said application is disclosed a weighing scale and computing mechanism attached thereto and controlled thereby, by which the total cost of the article weighed is computed and set up on visual indicators, visible to both the dealer and the customer, and a printed record thereof is made.

The prime object of the present invention is to provide means for automatically accumulating the total of the amounts so computed. A further object is to provide means whereby the computed result may be excluded from the total in case the sale is not made, and to provide safeguards to prevent such exclusion of a result in case the sale is made. Another object is to provide means for keeping separate totals of the values of different classes of articles weighed, such as groceries and meats, etc., or the amounts handled by different clerks, or both, and also to provide means for accumulating a grand total of all transactions which have been completed.

The method of attaining these and other detailed objects of the present invention will be fully set forth in the specifications and drawings and in the appended claims.

In the drawings:

Fig. 1 is an end elevation showing parts of the machine illustrated in the application referred to and the totalizer and connections thereto which have been added in the present invention.

Fig. 2 is a sectional view of the dash pot device used for limiting the time during which the totalizer can be thrown out of operating position.

Fig. 3 is a plan view of the totalizer, showing the operating racks in section.

Fig. 4 is a sectional view of the totalizer taken on line 4—4 of Fig. 3.

Fig. 5 is a sectional view of the totalizer showing certain modifications in the carrying mechanism, shown as taken on line 5—5 of Fig. 3.

Fig. 6 is a section of the totalizer taken on the same line as Fig. 4 but showing certain other modifications in the carrying mechanism.

Fig. 7 is an end elevation of a modification of the device, similar to Fig. 1 but showing the totalizer on the opposite side of the operating racks, and showing also the product indicators shown in the application mentioned, and the method by which a "No Sale" indicator, for use when the totalizer is thrown out, is connected to the flash mechanism already on the machine.

Figs. 11 and 12 show one of the differential elements of the computing device, with means for raising and lowering it, the element being in its raised position in Fig. 11 and in its lowered position in Fig. 12.

Figure 15:
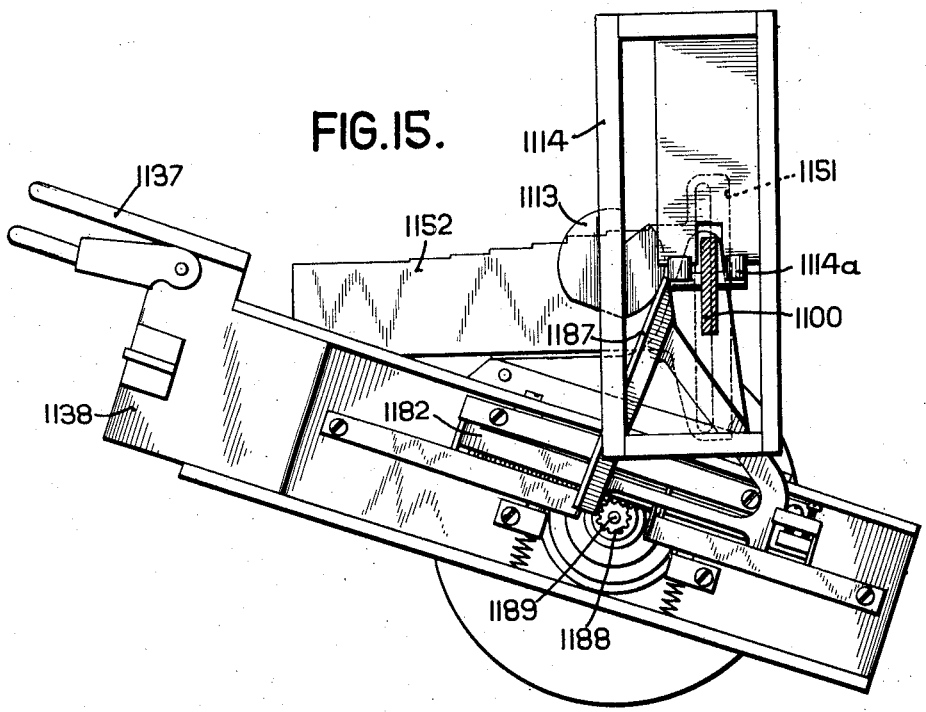
Figure 22:
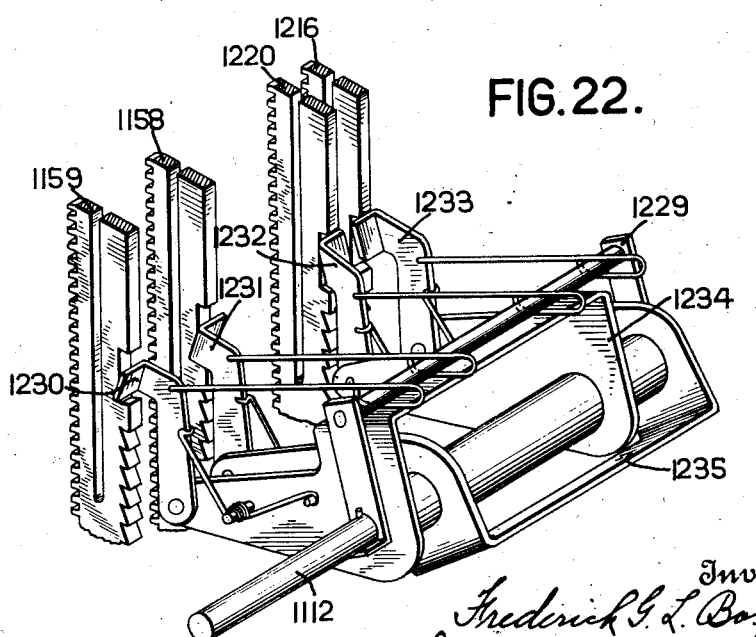

Fig. 13 is an elevation of a computing scale to which the present improvement may be applied, the scale casing being removed to show the operating mechanism, Fig. 14 is a sectional view along line 14—14 of Fig. 13 showing a portion of the multiplying or computing mechanism of the scale, Fig. 15 is a detail view illustrating the operation of the computing mechanism, Fig. 16 is a sectional view illustrating the operation of the hundreds or dollars rack bar of the machine, Fig. 17 is a sectional detail of a vernier device for picking readings from the computing mechanism, Figs. 18 and 19 are sectional views taken along line 18—18 and 19—19, respectively, of Fig. 17, Fig. 20 is a sectional view illustrating the operation of the tens or dimes rack bar of the machine, Fig. 21 is a detail section illustrating the operation of the hundreds or dollars rack bar of the machine with the parts in different position from that illustrated in Fig. 16, Fig. 22 is a perspective detail view showing mechanisms for adding in a product of a predetermined weight and a variable price per unit weight, Fig. 23 is a perspective detail view illustrating the transfer mechanism for transferring from the tens to the hundreds rack under certain conditions, Fig. 24 is a detail view of certain parts shown in Fig. 14 illustrating the operation of the price per unit weight indicators.

Like numerals designate like parts in all of the figures.

The computing scale to which the present improvements are applied will be briefly described in connection with Figs. 11 to 24 so that the relation of the improvements to the weighing and computing mechanisms will be clear. The scale as shown in Fig. 13 comprises a beam 1100 pivoted at 1101 and provided with a load support at 1102 and load counterbalancing means in the form of a spring 1103. Movements of the scale beam from its normal rest position in response to weighing operations are indicated by a weight chart 1104 carried by a suitable drum which is rotated by a rack and pinion 1105, the rack being connected to the beam 1100 through a rod 1105a. The capacity of the scale may be increased by a capacity weight 1106 carried by a pivoted arm 1107. The arm is held in the position shown, supporting the capacity weight free of the beam, by a latch 1108. A handle 1109 serves to release the latch permitting the arm 1107 to rotate counterclockwise about its pivot and deposit the capacity weight 1106 in suitable V shaped notches in the beam 1100. This movement of the arm 1107 through suitable linkage rocks a shaft 1112 which through additional linkage 1111 moves an indicator 1110 from obscured to unobscured position, showing that the capacity weight is in use and that its effective weight must be added to the reading of the chart 1104 to obtain the true weight of an article on the load support.

The computing mechanism through which the weight of an article on the load support may be multiplied by a selected price per unit weight and its total price indicated on the wheels 3 is controlled conjointly by the scale beam 1100 and a unit price selecting member 1138 shown in Figs. 14 and 15. This member 1138 consists of a pivoted frame which may be turned about its pivot by a pinch lever 1137. A suitable pawl operated by the pinch lever coacts with a toothed segmental plate so that the pivoted frame may be moved to different angular positions and held against displacement in the position to which it is moved. The different angular positions of the frame 1138 correspond to different prices per unit weight and a suitable index carried by the pinch lever may coact with price per unit weight graduations on the scale casing.

The actual computing or multiplying operation is effected by rotating a handle 115 (Fig. 13) which through gear trains 116 rotates shafts 1118 and 1 on which are mounted a series of cams for controlling and operating the computing mechanism. The beam 1100 in its movements shifts vertically a frame member 1114 (Fig. 15) which is mounted on knife edges 1114a on the beam and carries a cam member 1113 which comprises the control element of the multiplying mechanism for fixing the weight factor of the product. This cam member 1113 of course always assumes a vertical position corresponding to the displacement of the beam 1100 and hence by its position may represent the weight factor. Incidentally the weighing parts are locked in position on operation of handle 115 through mechanism operated by the cams on shaft 1118 so that the cam member 1113 is firmly held in position during the computing operation. As the operation of this locking mechanism is not essential to an understanding of the present invention and is fully described in the patent above referred to it has not been illustrated in the present case.

The price factor of the computation is entered through a carriage 1182 (see Fig. 15) slidably mounted on frame member 1138 and carrying a rack which meshes with a pinion 1188 on shaft 1189. The carriage also carries a straight edge or multiplying bar 1187. A driving pinion 1190 (see Fig. 16) also fixed to the shaft 1189 meshes with a gear segment 1191 operated by a spring 1192. A cam 1193 on shaft 1 coacts with a roller carried by the segment and holds it against the action of the spring until the operative handle 115 is rotated. During a certain portion of the revolution of the handle the cam 1193 permits the spring 1192 to rock the segment 1191 rotating pinion 1190 and shaft 1189 which in turn through pinion 1188 (see Fig. 15) moves the carriage 1182 until the multiplier bar 1187 strikes the cam member 1113. It is obvious that the extent of movement of the carriage 1182 depends on the vertical position of cam member 1113 and the angular position of the frame 1138 and its position at the extent of its movement is thus a function of the weighing load which effects movement of beam 1100 and the price per unit weight represented by the angular position of frame 1138. Its position may therefore represents the product of the weight on the scale load support and out of a series of different prices per unit weight.

The extent of movement of the multiplying bar 1187 is comparatively small and readings of its positions are taken through a vernier device. This device is fully described in the prior patent referred to above and will be very briefly described in the present case. The vernier (see Figs. 17, 18 and 19) consists of a notched vernier wheel 1194 carried on shaft 1189 and having a plurality of equally spaced notches. Slidably mounted in a casing surrounding the wheel are a plurality of pawls 1195 arranged in vernier relation to the notches and spring pressed toward the wheel. A cam ring 1196 normally holds the pawls away from the wheels but on operation of handle 115 is shifted through linkage 1197 (see Fig. 11), controlled by a suitable cam on shaft 1, to permit the pawls to be spring pressed into contact with the vernier wheel 1194. Such pawls as aline with notches in the wheel drop into them and limit the movement of a finger arm 1199 to control the lowest denomination or cents indicator and type wheel. Finger arm 1199 is carried on a stub shaft 1201 which carries a pinion 1202 (see Fig. 11) meshing with a spring driven sector 203 which in turn is controlled by cam 204 on shaft 1. Sector 203 carries a pawl 205 which engages ratchet teeth on a rack rod 2 for setting the units product indicator.

Prior to the setting of the rack rod to indicate the computed price it must be restored to zero unless it is already in that position. This is done by a linkage 1168 controlled by cam 167 on shaft 1. At the beginning of rotation of shaft 1, on turning of handle 115, this cam rocks a member to which link 1168 is attached and the initial movement of the latter rocks a pivoted member 1169 clockwise causing it to rock bail 166, which bail releases pawls 205 from engagement with the ratchet teeth in bar 2. The continuing movement of link 1168 rocks lever 1172, to which it is attached through a pin and slot connection, and this lever lowers restoring bail 1170 which extends through slots in all the rack bars and restores them to zero. After this, bails 166 and 1170 again move to the position shown in Fig. 11 and the rack bar 2 is ready to receive another entry.

The cam 204 thereafter presents a low portion on its surface to a roller carried by gear sector 203 and the latter is moved by its spring to drive pinion 1202 and shaft 1201 until the finger arm 1199 thereon (see Fig. 17) encounters a pawl 1195 which has entered a notch in the vernier wheel 1194. The gear segment 203 thus moves a distance corresponding to the units or cents in the product of the weight of the article on the load support times price per unit weight. This movement of the sector 203 lowers the attached pawl 205, the latter clicking over the ratchet teeth in its descent, until it has passed a number of teeth fixed by the price computation. Shortly after the pawl 205 is thus positioned the cam 204 again rocks sector 203 back to normal position, whereupon the pawl 205 raises rack 2 a distance commensurate with the units order of the computed total price and the latter in its movement may operate suitable gears for setting the indicating wheels 3 and if desired suitable type wheels represented in the drawings by pinions mounted on nested sleeves. This explains the action operating the units or cents rack bar.

The tens or dimes product rack bar is set from a stepped disk 1207 (Figs. 17 and 20) fastened to the vernier wheel 1194 and hence also positioned according to the total price computation. The tens rack bar 1216 (Fig. 20) may be operated by a pawl 1212, this pawl being released and the rack bar being lowered by the same mechanism just described for the units bar. The pawl 1212 is lowered by a cam 1215 on shaft 1 and its downward movement is limited by a plunger 1208 cooperating with stepped disk 1207. After the pawl is lowered, it is raised to position the rack bar through the additional rotation of cam 1215.

The hundreds or dollars rack bar 1220 (Fig. 21) is operated by a pawl 1221 on spring operated segment 1191 which is driven from the vernier shaft 1189 and which is released for movement during computing operations by the cam 1193 on shaft 1. The operation of this mechanism is generally similar to that just described for the units and tens mechanism and need not be explained further.

The price per units weight selected by the position of the frame 1138 is also registered on indicating wheels 1240 (Fig. 13) which are set through rack bars 1159 shown in Fig. 24. The units bar is operated by a pawl 1156 and the tens bar is operated by a pawl 1157. The pawls are released by bail 166 and the rack bars restored to zero by bail 1170 in the manner previously explained in connection with the products bars. The frame 1138 carries a roller engaging in a slot in horizontally slidable frame 1151 so that the latter is positioned by the frame 1138. The frame 1151 includes two differentially stepped plates 1152 and 1153, the former being the tens rack selector and the latter the units rack selector. Pawl 1156 is mounted on a lever 1154 and pawl 1157 is mounted on a lever 1155. When a computing operation is not in progress a bail 1160, operated by a link 1161 connected with a cam follower which engages cam 1162 on shaft 1, (see also Fig. 14) engages extensions on the levers 1154 and 1155 and holds them clear of plates 1152 and 1153 so that frame 1138 may be set. When a computing operation is performed the bail 1160 is lifted clear of levers 1154 and 1155 and the former rotates clockwise until it is stopped by stepped plate 1153 while the latter rotates until it is stopped by stepped plate 1152, pawls 1156 and 1157 meanwhile clicking past their cooperating ratchet teeth. The descent of the pawls 1156 and 1157 is thus governed by the position of the stepped plates and is in accordance with the price per unit weight selected by the position of the frame 1138. Shortly after this cam 1162 operates link 1161 which through bail 1160 again rocks levers 1154 and 1155 to normal position thus causing the pawls 1156 and 1157 to raise racks 1159 an amount fixed by the positions of plates 1152 and 1153. The racks through suitable pinions may operate wheels 1240 to indicate the selected price per pound.

The application of the capacity weight 1106 (Fig. 13), which may be considered to have an effective weight of ten pounds, to the weight beam 1100 requires that the amount set up on the price racks through the mechanism just described be increased by ten times the selected price per pound. In practice this latter figure is entered on the tens and hundreds products racks first and the additional amount as picked from the vernier mechanism is then added to it. It may be necessary under these circumstances to transfer from the tens to the hundreds racks when the vernier reading is entered. The tens and hundreds rack bars 1216 and 1220 are moved to register the extra product resulting from the application of the capacity weight through the mechanism illustrated in Fig. 22. As previously explained the application of the capacity weight to beam 1100 rocks shaft 1112. The rocking of this shaft rocks a bail 1229 thereby allowing fingers 1230, 1231, 1232 and 1233 to swing against the rear of the price per unit weight racks 1159 and 1158 and the tens and hundreds product racks 1220 and 1216. Upon movement of these racks to zero position the fingers drop into the notches. Fingers 1230 and 1232 are connected to a common bail 1234 which is loose upon a sleeve on shaft 1112, and fingers 1231 and 1233 are carried by a similar bail 1235. When the price per unit weight rack rods 1158 and 1159 are set up with the price per pound, a similar setting will be effected upon the tens and hundreds product racks 1216 and 1220 representing the value of the product of the effective value of the capacity weight times the selected price per unit weight. When the supplemental product from the vernier is set up upon the product racks, the fingers 1232, 1233 are cammed back out of the notches and the rods rise to the total product position.

Such transfers as may be necessary between the tens and hundreds product racks are effected by the mechanism shown in Fig. 23. A transfer lever 1224 carries a transfer pawl 1225 which has a tooth cooperating with the ratchet teeth on hundreds rack 1220. A camming portion 5 on the lower end of tens rack 1216 cams the lever 1224 clockwise when the tens rack rises through transferring position and raises the pawl 1225 to raise the hundreds rack 1220 one notch. The transfer pawl is thrown out by a finger 1228 (Fig. 16) which is rocked by the bail 166 into contact with the tail of the transfer pawl.

This multiplying or computing operation will now be briefly summarized to bring out its timing relations with the totalizing operation which forms the subject matter of the present invention. An article whose total price is to be computed is placed on the load support and the operating handle is turned. The product racks are first returned to zero and thereafter set up according to the required total price incidentally setting up the indicator wheels to indicate the total price. This multiplying operation with its coincident indication of the product is known in the scale art as computation and will hereinafter be identified by this term. The cycle of operations through which it is performed will likewise be identified as a computing cycle. The present invention, in addition to the computing operation, provides for a totalizing operation through which the results of successive total price computations are added or totalized. The totalizing operations do not coincide with the computing or multiplying cycles but each totalizing operation overlaps two computing cycles. A computing or multiplying operation or cycle is completed, indicating the result on suitable indicators and retaining the setting of the rack bars through which the indicators are set. During the following computing operation or cycle the total price obtained from the preceding one is thrown into totalizers, the rack bars operating the totalizers on their return, which occurs as a preliminary in the following computing operation, serving to operate the totalizers. To avoid confusion, then, the term "computing cycle" will be understood to include placing an article on the scale load support and turning the operating handle to effect multiplication of the weight by the selected price per unit weight, the result of the multiplication being indicated, if desired, on suitable indicators.

As just described the computing operation is performed by rotating the cam shaft 1 in the counterclockwise direction indicated by the arrow. The indicators 3 (see Fig. 7) are set to indicate the computed result by means of the racks 2 1216 and 1220 which are lifted for this purpose by cams on shaft 1 and other mechanism distances controlled by the computing mechanism. Racks 2 1216 and 1220 and indicators 3 are held in this position, thus maintaining the indication, until the beginning of the succeeding operation of the machine, when they are positively returned to their zero positions. It should be noted that each of the racks 2 1216 and 1220 represents a separate denominational order. Thus if we wished simply to accumulate the total of all the computed results it would simply be necessary to use an ordinary totalizer and mesh the gears attached to the totalizer wheels with the racks of corresponding denomination before the racks are operated to position and withdraw them before the racks are restored to zero. As the racks are moved to position successively, as may be seen by an inspection of the application referred to, a simple transfer mechanism would perform all of the necessary carrying operations with this arrangement.

However, as this device is intended for use in retail food distribution, the above mentioned arrangement will not be sufficient. This is the case because in the retail sale of food the customer often does not decide on the purchase until he knows the cost of a particular article, and then often decides against the purchase. This is particularly true in the handling of meats, for which field the device described in the application mentioned and the improvements herein described are particularly adapted.

I therefore provide that the totalizer shall not be operated until after the cost of the article weighed has been computed and indicated by the machine, i. e. until the operation of the machine is entirely completed. In order to obviate the necessity of a special operation for accumulating the computed result onto the totalizer, I provide that the result last computed shall be registered on the totalizer at the beginning of the next computing operation of the machine as the racks 2 1216 and 1220 and indicators 3 are being restored to their zero positions. Then in case the customer decides not to purchase the article weighed I provide a push button 10 which may be used to throw out the totalizer and prevent the accumulation of the last computed result thereon.

Were there no safeguards against such action it would then be possible for a clerk to depress the push button 10 and prevent the accumulation of the cost of an article which was really sold. In order to prevent this I have provided three safeguards. The first of these is a "No Sale" indicator 14 (see Fig. 7) which, as soon as push button 10 is depressed throwing out the totalizer, is thrown in front of the cost indication, in a manner which will later be described, making it perfectly plain to both dealer and customer that the transaction is not being registered as a sale. The second is a warning signal which is sounded when the "No Sale" push button 10 is depressed. This will attract the attention of the customer to the machine and compel notice of the "No Sale" indicator, and will also apprise the proprietor or others who may be near by that the transaction is not being registered. Such a signal is shown in Fig. 7 as the bell 30 operated by the push button. With these two safeguards it would still be possible for the clerk, in certain cases to wait until the customer and others had departed, and then press the push button 10 destroying the registration at any time before another customer came into the store and the scale was again used. In order to prevent such abuses I provide still a third safeguard, which is designed to prevent operation of the push button 10 and destruction of the registration, longer than a certain time—say for example one half minute or one minute after the result has been computed and indicated. This will give ample time for the clerk to destroy the registration if the customer decides, after learning the cost, not to make the purchase, but will prevent a destruction of the registration after the customer has departed and there is no longer any one to observe the deception.

Such a safeguard is illustrated in Fig. 1 as a plunger 42 which has entered a notch in push button 10 preventing operation thereof. Plunger 42 is removed from notch 41 during the operation of the machine; and the time after the completion of the operation before the plunger again locks button 10 is controlled by the dash pot 40. The construction and operation of this mechanism will be described in detail later.

Except for certain novel features in the carrying mechanism, which will later be described, the totalizer is similar to others well known in the art, so the mechanism by which it is operated will be described before describing the construction of the totalizer itself.

Referring first to Fig. 1, where the mechanism is shown in the position which it assumes after the completion of a computing operation, it will be seen that the totalizer 70 is in engagement with the racks 2 1216 and 1220 which are holding the indicators 3 (shown in Fig. 7) in position to indicate the result of the last computation. At the beginning of the next operation of the computing device the racks 2 1216 and 1220 are pulled downward to their zero positions as previously explained. As they are pulled downward they rotate the wheels of the totalizer and accumulate thereon the amount of the result of the last computation the indication of which has just been destroyed. Before the racks 2 1216 and 1220 are operated to indicate the result of the new computation the cam 67 on shaft 1 rocks arm 66 in a clockwise direction sliding the totalizer 70 in guides 69 away from racks 2 1216 and 1220, at the same time performing the necessary carrying operations in a manner which will presently be described. The indicator racks 2 1216 and 1220 are then raised to the positions necessary to indicate the new result and position the type wheels carried by shaft 55 which are used to print the computed result as described in the application mentioned. The totalizer 70 being at this time held out of engagement with said racks is not effected thereby. After the racks are in position and while the printing operation is taking place the cam 67 allows springs (not shown) to return the totalizer 70 into engagement with racks 2 1216 and 1220, and it is in this position when the operation is completed.

At the beginning of the operation, before racks 2 1216 and 1220 are returned to their zero positions the cam 17 (Figs. 1 and 7) on shaft 1 rocks arm 16 and through connecting rod 15, arm 12, and connecting rod 13 (Fig. 7) operates the usual flash mechanism 4 to conceal the indicators during their operation, in a manner similar to but slightly different from that shown in the application mentioned.

The preceding two features constitute the only difference between the normal operation of the machine with the present improvement and that described in the application referred to. However, as has already been explained, it is sometimes necessary to prevent the operation of the totalizer, because every amount computed does not necessarily mean a sale. The method by which the operation of the totalizer is prevented in such a case and the safeguards to prevent its misuse will now be described.

After a computing operation has been performed and the result indicated the mechanism is in the position just described and shown in Fig. 1, except that the plunger 42 has not yet entered notch 41 in push button rod 10. If on seeing the cost, the customer decides not to make the purchase, the dealer simply presses "No Sale" button 10. This strikes a downwardly projecting part of arm 12 which is rocked thereby until an upwardly projecting part of the same arm strikes roller 21 on the frame of the totalizer 70 and pushes the totalizer, against the action of the springs (not shown) just far enough in guides 69 to throw it out of engagement with the operating racks 2 1216 and 1220. At the same time the rocking of arm 12 (see Fig. 7) acting through connecting rod 13 serves to move the flash twice the distance of its normal movement and thus expose a "No Sale" indication 14 which serves to conceal the indication of the result which is not wanted and to indicate to the dealer and customer that the transaction is not being registered as a sale. When the push button 10 has been fully depressed it is locked in this depressed position by means of a pawl 23 which enters a notch 22 in the push button rod. This retains the arm 12 in its rocked position holding totalizer 70 out of engagement with the operating racks, and the "No Sale" indicator 14 in front of the indicators 3 until, in the course of the next operation of the computing device, the racks 2 1216 and 1220 have been returned to zero position without actuating the totalizer. During this operation of the machine, as arm 70 66 moves to withdraw totalizer 70 in the usual manner, it strikes, at the end of its movement, the projecting tail on pawl 23. (See Fig. 1.) This throws pawl 23 out of notch 22, and releases push button 10 and arm 12. The arm 12 then drops till arrested by cam 17, through arm 16 and connecting rod 15, allowing the "No Sale" indicator 14 to drop out of sight and expose the usual flash, and the arm 12 comes to a position which will allow the engagement of the totalizer 70 with the racks 2 1216 and 1220 when the cam 67 again allows such engagement.

The depression of push button 10 which throws out the totalizer 70 also sounds a warning signal to attract the attention to the fact that the transaction is not to be registered and cause the customer to notice the no sale indicator. Such a signal is shown as a bell 30 in Fig. 7. For the sake of clearness it has been omitted from Fig. 1. This bell is sounded by means of projection 31 on push button rod 10 operating the tapper 32 in a usual manner, when the push button is depressed.

It has already been stated that provision has been made for preventing operation of the push button 10 longer than a pre-determined time after the computing operation has been completed and the result indicated. This might obviously be accomplished by a simple clockwork device wound by the operation of the computing machine and released at the completion of an operation. I prefer, however, to use the dash pot arrangement shown in Fig. 1 and illustrated in detail in Fig. 2. This has been omitted from the form shown in Fig. 7 but could easily be supplied. The operation of the computing machine causes cam 44 to rock arm 43 which pushes plunger 42 downward out of notch 41 in the push button rod 10. This plunger 42 is attached to a piston 45 in the dash pot cylinder 40. As arm 43 pushes plunger 42 downward it compresses spring 48, and the fluid, which may be air or a suitable liquid, in the dash pot 40 flows around piston 45 as it descends. This it can do readily because of the manner in which the packing is placed on piston 45. When the operation of the machine is completed the cam 44 releases the arm 43. This allows spring 48 to move piston 45 and plunger 42 upward. This action takes place slowly because of the fluid in the dash pot 40 and the packing on piston 45. When the piston 45 has ascended almost to the point where plunger 42 will lock the push button it comes opposite recesses 50 in the sides of the cylinder. These allow the fluid in the cylinder to flow quickly past the piston 45 and give a quick movement to the piston at the end of its stroke. This secures a sudden locking of the push button and prevents wear which might take place if it was only caught by the point of the lock.

The length of time which will elapse between the completion of the computing operation and the locking of the push button can be adjusted by either of two methods, both of which are shown in Fig. 2. The first of these is a needle valve 46 in piston 45 which may be adjusted by means of a thumb nut 47 thus permitting the fluid to pass the piston 45 more or less freely to secure the desired interval. The other is a thumb screw 49 for regulating the force exerted on piston 45 by spring 48.

The other elements of structure shown in Fig. 1 belong to and will be described in connection with the modification illustrated in Fig. 7.

In Fig. 7 the above described structures are modified so that the totalizer may be placed on the other side of the operating racks 2 1216 and 1220. In this modification the roller which throws out the totalizer 70 is mounted on push button 10 and pushes out the totalizer directly instead of through the intermediate action of lever 12. The pawl 23 which locks the push button in its depressed position is in this case pushed out by the frame of the totalizer itself as it is being withdrawn by cam 67 during the normal operation of the machine. On account of the positions of parts the cam 67 and arm 66 work through connecting rod 65 and arm 68 to move the totalizer 70 into and out of engagement with the operating racks 2 1216 and 1220. The timing and operation of the device is otherwise exactly the same as in case of the structure shown in Fig. 1 and already described.

The construction of the totalizer itself will now be described by reference to Figs. 3 and 4. Totalizer wheels 72 are mounted on shaft 71. The wheels 72 of denominations corresponding to the operating racks, have gears 73, fastened to the sides thereof, which mesh with racks 2 1216 and 1220 at the proper time, and serve to operate the totalizer as already described. The modification here described has only three such operating racks but the same structure can be used with a larger or smaller number if it is desired to increase or decrease the size of the amounts which may be added in at one time. Transfers from lower to higher denominations above the highest denomination directly controlled by the racks, are effected in the usual manner by means of single tooth transfer gears 75 mounted on the sides of wheels of lower denomination and gears 76 mounted adjacent thereto on the wheels of higher denomination and the interconnecting gears 77 mounted on the shaft 78.

Inasmuch as the racks 2 are restored to their zero positions and operate the totalizer wheels of different denominations simultaneously the above described mechanism can not be used to perform the carrying operations required between these wheels. This is therefore accomplished as follows: Ratchet wheels 74 are mounted on the sides of the wheels of higher denomination and similar single tooth transfer gears 75 on the sides of wheels of lower denomination adjacent thereto. The carrying operation itself is performed by pawls 80 mounted to rock on studs 81 in arms 82 which in turn are mounted to rock on shaft 83 fixed in the frame of totalizer 70. Springs 88 attached to pawls 80 tend to throw them into engagement with the ratchets 74, and also to hold arms 82 in their retracted position shown in Fig. 4. Pawls 80 are normally held out of engagement with ratchets 74 by means of detents 84 mounted to rock on studs 85 in arms 82, and held in position by springs 87. As the totalizer is withdrawn from the operating racks as described, rollers 86 on the arms 82 ride over cams 90 which are fixed to the frame of the machine. The arms 82 are operated successively beginning with the lowest denomination. When pawls 80 are held in the position just described by means of detents 84 they will not touch the ratchets 74 nor affect the totalizer wheels as the arms 82 are operated by cams 90. When the totalizer wheel of lower denomination moves from its nine to its zero position the single tooth on gear 75 rocks detent 84 and allows pawl 80 to enter a tooth on ratchet 74 on the totalizer wheel of next higher denomination. Then when the arm 82 is rocked as the totalizer is withdrawn the pawl 80 moves totalizer wheel 72 of higher denomination forward one tooth. The operation of the arms 82 is made successive because the transfer to a higher denomination may depend on whether or not a transfer has been made from a lower denomination. When the totalizer has been withdrawn to the extent of its movement and the last of the arms 82 has thus been operated the tails on pawls 80 strike fingers 91, fastened to the framework of the machine, which lift pawls 80 out of ratchets 74 and allow springs 87 to replace detents 84 in position to hold pawls 80 out of ratchets 74 until another transfer operation is necessary.

The mechanism thus far described will be quite adequate in the normal operation of the machine described in the application mentioned. It will be noted, however, that the machine described in that application has a computing device designed to compute the values of weights up to ten pounds, and for weights between ten and twenty pounds the value computed by the computing mechanism per se is added directly on the racks 2 to the value of ten pounds which is first set up on these racks. This means that these racks may move an amount representing more than ten units. The units rack is not so affected because in the adaptation there illustrated the use of fractional prices per pound in the computation has not been provided for. If it is desired it can be provided for in the same manner as in the case of the higher denominations.

If it is desired to use the present improvement in connection with a machine in which the racks thus move more than ten units of movement a modification in the carrying mechanism, such as that illustrated in Fig. 5 must be used. Reference to the application referred to will show that when the tens rack, for instance, is operated more than ten units there is a carrying operation to the hundreds rack in the ordinary operation of the machine therein described. Therefore a carrying operation from tens to hundreds in the totalizer must not take place simply because the tens rack has moved ten units more than it really should do to accumulate the proper number on the totalizer. When the tens rack moves more than ten units the transfer from tens to hundreds on the totalizer should take place when, and only when, the units of movement of the tens rack which it moves after completing its first ten units of movement, added to the number already set up on the tens totalizer wheel suffice to turn the tens totalizer wheel from the nine to the zero position.

The mechanism by which this is accomplished is shown in Fig. 5. It is similar to the construction shown in Fig. 4 but double detent 184 is substituted for the detent 84 shown in Fig. 4. Reference to the foregoing description and to the application referred to will show that when the tens rack is operated a distance of more than ten units of movement a cam shaped projection 5 thereon (see Fig. 1) rocks an arm 6 to perform the carrying operation to the hundreds rack. I have here added a vertically extending rod 7 which is pivoted to arm 6 so that when arm 6 is operated to cause a transferring operation on the racks the rod 7 will be lifted and thereby prevent the same transfer being again made on the totalizer. This is accomplished in the following manner: The rod 7 is lifted into the path of a pawl 96 which is mounted on the lever 82. (See Fig. 5.) When totalizer 70 is moved forward into engagement with the racks 2 pawl 96 strikes rod 7 and is thereby rocked in a counterclockwise direction striking a trip pawl 95 on pawl 80. This raises pawl 80 slightly from the position shown in Fig. 5 and allows spring 87 to pull the higher portion of detent 184 under the projection on pawl 80. The pawl 96 swings clear of pawl 95 on pawl 80 so that pawl 80 is only held out of ratchet 74 by the detent 184, and the spring trip pawl 95 allows the parts to again assume the positions shown in Fig. 5 when the totalizer is withdrawn and finger 91 again raises pawl 80 to its normal position. It should be noted that finger 91 does not raise pawl 80 high enough to allow the higher portion of detent 184 to spring under the projection on pawl 80. When the mechanism is in this position the single tooth on gear 75 passes the teeth on detent 184 once oftener than it should if the tens rack were not raised ten units higher than need be to indicate the number which is actually to be accumulated on the tens wheel of the totalizer. The first time the tooth on gear 75 passes the critical point it strikes one of the teeth on detent 184 and rocks it far enough so that pawl 80 drops back into the position shown in Fig. 5. In this position it can not engage the ratchet 74 and it also holds detent 184 in the position shown in Fig. 5. Now if the number more than ten units which the tens rack has moved and the number already on the tens wheel of the totalizer are sufficient to cause a transfer the tooth on gear 75 will again pass detent 184 and cause the transfer just as was done in the structure illustrated in Fig. 4.

A careful examination of the application referred to will show another peculiarity which has not yet been considered. This is the fact that the units rack moves a distance corresponding to ten units minus the number of units indicated. It will be noted that the movement of the units rack is controlled by a vernier device, and therefore it would be possible to make the units rack operate a distance proportional to the number of units to be registered by substituting a retrograde vernier for the direct vernier illustrated in that application. In case it is desired not to make this change the transfer mechanism may be constructed as shown in Fig. 6. This shows pawl 80 adapted to normally engage ratchet 74, and when the tooth on gear 75 passes the detent 284, which is now substituted for detent 84 shown in Fig. 4, detent 284 lifts pawl 80 out of the ratchet 74 and holds it thus until pawl 80 is lifted in the usual manner by finger 91, thus releasing detent 284. In this case the numerals will have to be placed on the units totalizer wheel in the reverse order, and the transfer to the tens wheel will take place when the units wheel does not pass through its zero position. That is if the wheel is not turned through its zero position the number recorded thereon is smaller than that previously recorded (because the units rack 2 always moves less than ten units) and a transfer is necessary and will take place because in this case the detent 284 has not lifted pawl 80 out of its operative position. If the wheel is turned through its zero position the number registered thereon will be larger than that previously so registered and a transfer will not be necessary and will be prevented in the manner already described.

Figure 9:
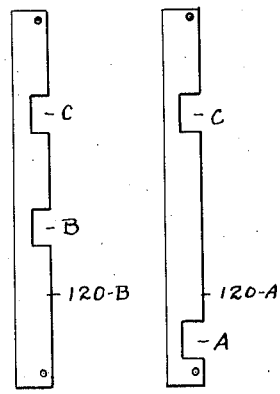
Fig. 9 is a detail showing two of the control bars used to select the totalizers which shall be used in the case where there are two totalizers for special items and one for the grand total.
Figure 10:
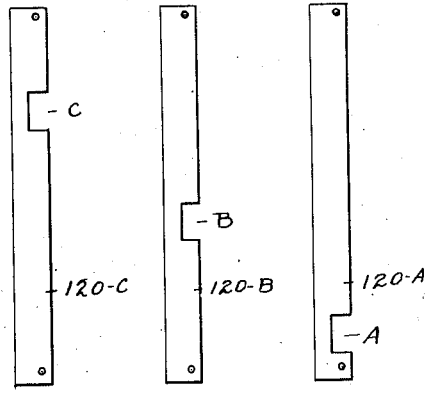
Fig. 10 is a detail showing the three control bars which will be used if the three totalizers shown in Fig. 8 are to be used separately with none for the grand total.
Figure 8:
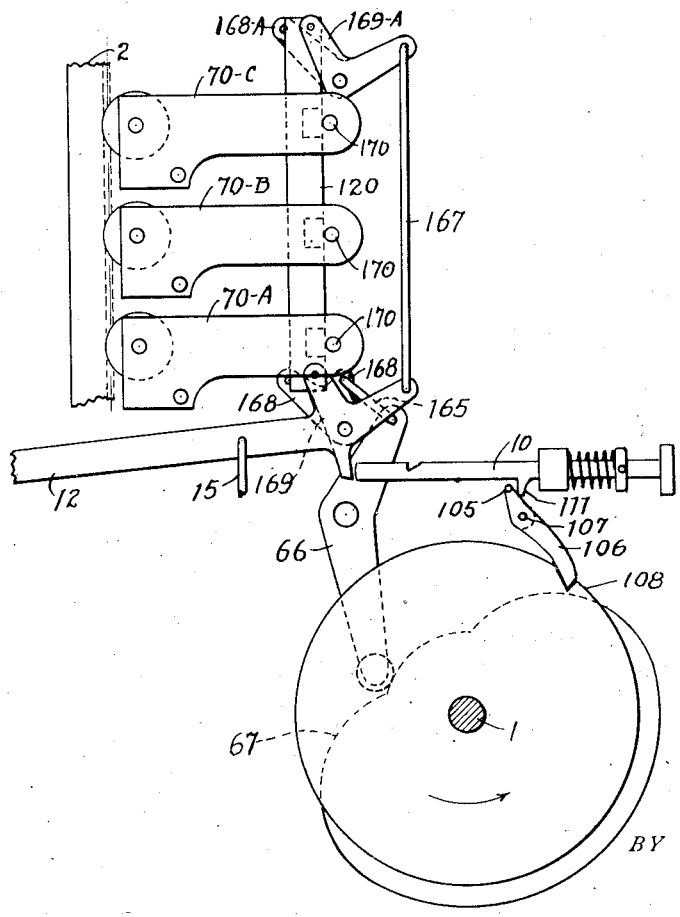
Fig. 8 is a similar end elevation of a modification showing how a plurality of totalizers can be attached to the machine.

It is possible that a device of this kind would be used in a place where groceries and meats, for example, are both sold over the same scale and separate totals of the two classes of transactions are desired. Or it might be that separate totals of the amounts handled by two or more different clerks would be desired. Or a combination of both of these results might in some cases be found desirable. It may also be desired to accumulate a grand total of all the transactions which have been completed. My device can be adapted to perform any or all of the above described functions when so desired by simply adding the requisite number of totalizers, and providing selective means for controlling the operation thereof as illustrated in Figs. 8, 9, and 10. It will be obvious that any reasonable number of totalizers can be used in the device illustrated in the application referred to by simply lengthening the rack connections to the indicators and raising the height of the indicator centers. In the device as there illustrated it is possible to raise the height of the indicators quite materially to allow placing a comparatively large number of totalizers therein, because the distance of the indicator center above the scale platform is comparatively small, and thus admits of being considerably increased. In Fig. 8 are shown three totalizers, for the sake of illustration, though it is evident that the number may be made greater or less as desired. In the normal operation of the machine all of the totalizers 70 are withdrawn as usual by means of the arm 66 operated by the cam 67. All of the totalizers are in this case withdrawn simultaneously by means of a vertical bar 120 which presses against cross rods 170 of the totalizer frames. Bar 120 is connected at its ends to two bell crank levers 168 and 168—A which are connected by one of the links 167 in such a manner that they will rock in unison. Bell crank lever 168 is operated to move bar 120 and withdraw the totalizers by means of connecting rod 165 which connects it with arm 66. When the "No Sale" push button 10 is operated it moves arm 12 as previously described. Attached to arm 12 is one of a series of bell crank levers 169 connected to bell crank lever 169—A by one of the rods 167, and another of the bars 120, so that when the "No Sale" push button 10 is depressed all of the totalizers 70 will be withdrawn from the racks 2 a short distance, as previously described in such cases.

Consider first that the totalizer 70—A and 70—B are to be used for registering sales of groceries and meats, or sales made by different clerks, and the totalizer 70—C used to accumulate the grand total of the amounts accumulated on 70—A and 70—B. The selection of the totalizer to be actuated in a given case is made by means of one of a series of push buttons similar to and in alignment with push button 10, and therefore not visible in the drawing, Fig. 8. Each of these push buttons co-operates with a downwardly extending arm on one of the bell crank levers 169 operating one of the bars 120. At the completion of an operation of the machine all of the totalizers 70 are in engagement with the operating racks 2. It is then necessary to selectively withdraw those not to be actuated before the next operation of the machine accumulates the last computed result thereon. In the case under consideration the totalizer 70—C should be operated every time either of the others is operated, and the choice between the others must always be made before the totalizing operation takes place. This is done by depressing the push button marked for, say the A totalizer. This rocks forward the bar 120—A (see Fig. 9) which pushes out the totalizer 70—B but allows totalizers 70—A and 70—C to remain in engagement with the operating racks. This is made possible by the notches A and C therein. If it is desired to operate the totalizer 70—B the push button controlling the bar 120—B is depressed.

If desired to have the three totalizers act separately without accumulating any grand total there will be three selecting push buttons controlling bars 120—A, 120—B and 120—C shown in Fig. 10. Each of these push buttons will thus allow one and only one of the totalizers to be operated.

It is easily seen that the number of totalizers used may be increased or decreased without changing the method of selection by simply increasing or decreasing the number of selecting push buttons and of bars 120 controlled thereby. It will also be possible to have two separate series, one to accumulate totals of various kinds of merchandise, and the other to accumulate totals of goods sold by various clerks. It is only necessary to provide properly notched bars 120 controlled by suitable push buttons.

In order to prevent the same figure being added simultaneously on the totalizers 70—A and 70—B it is necessary to prevent the operation of the computing machine unless one of the push buttons has been depressed. This is done by means of a pawl 106 which rests in a notch in cam 108. Attached thereto is a rod 105 which reaches across the path of projections 111 on each of the push buttons in such a manner that when any one of the push buttons is operated it rocks pawl 106 out of the notch in cam 108.

It may also be added that the push buttons are held in their depressed positions just as shown in Fig. 1 until the retaining pawls (not shown) are released by means of arm 66.

Although I have illustrated my invention as applied to the machine described in the application mentioned it could be applied to various similar devices, and many other changes in form and structure could be made by those skilled in the art within the scope of the present invention and the appended claims.

What I claim is:

1. In combination a computing mechanism; a totalizer for accumulating the results of successive computations performed by the mechanism; and means controlled by said computing mechanism for automatically operating said totalizer to register the result of one computation during the operation for making the succeeding computation, upon said computing machine.

2. In combination a computing mechanism; a totalizer for accumulating the results of successive computations performed by the mechanism; means controlled by the computing mechanism for automatically operating said totalizer to register the result of one computation during the operation for making the succeeding computation upon said computing mechanism and devices manipulative by the operator to prevent the operation of the totalizer after a computing operation to totalize the result of said computation.

3. In combination a computing machine; a totalizer for accumulating the results of successive computations performed by the machine; means for preventing the accumulation of any result if so desired; and controlling means for preventing the operation of said preventing means after the lapse of a specified time from the completion of the computing operation.

4. In combination a computing machine; a totalizer for accumulating the results of successive computations performed by the machine; and means co-acting with said totalizer and operable by the operator within a limited time after the computation has been made and the result indicated by the machine for selectively controlling the entering or nonentering of the amount upon the totalizer.

5. In combination a computing and totalizing machine comprising mechanism for effecting successive computations; a totalizer for accumulating the results of successive computations performed by the machine; means for operating said totalizer to register the result of one computation during the operation for making the succeeding computation and means with devices operable by the operator only for a limited time after the completion of the machine operation yielding said result to prevent the accumulation of that result on a totalizer.

6. In combination a computing machine; a plurality of totalizers for accumulating the results of computations made by the machine, selective means operable by the operator after the result of the computation has been attained by the machine, for selecting the totalizer on which the result shall be accumulated, and means for preventing the totalizing operation until such selection has been made.

7. In combination with a machine having provisions for setting up and visually displaying numeral amounts, a totalizer for accumulating a series of said amounts, means for preventing the operation of said totalizer at the discretion of the operator, and means brought into operation upon the suppressing of the action of the totalizer for obscuring the display of the numeral amount set up by the machine.

8. In a machine having a totalizer operating mechanism therefor, means for preventing the operation of the said totalizer by said mechanism, and means comprising a dash pot for restricting the time of operation of said preventing means to a determined time period.

9. In combination, a totalizer having accumulator elements of various orders which in their operation pass through their zero position and a carrying device having provisions for effecting carrying from lower to higher orders in said totalizer before the element of lower order which originates the carrying operation in said totalizer has passed through its zero position.

10. In combination computing mechanism with means for controlling the same to perform successive computations, a totalizer controlled by the computing mechanism to add the result of successive computations and means for operating the totalizer automatically upon each operation of the computing mechanism to enter the result of the preceding computation, means operable at the will of the operator for disabling the totalizer during any computing operation to prevent entry of the preceding computation and indicating means controlled by said computing mechanism to indicate a computation without entry of the result into the totalizer.

11. In combination computing mechanism with means for controlling the same to perform successive computations, indicating means operated by the computing mechanism to indicate the result of each computation, a totalizer controlled by the computing mechanism to add the result of successive computations and means for operating the totalizer automatically upon each operation of the computing mechanism to enter the result of the preceding computation and means operable at the will of the operator for disabling the totalizer after the operation of said indicating mechanism to prevent entry of the indicated computation.

12. In a cyclically operable machine, a first element, a second element with means for predetermining its operation by the first element and means for operating it during a subsequent operation of the first element, means for preventing at will the operation of the second element after operation of the first and time controlled means for disabling said preventing means after the lapse of a predetermined time from the completion of the operation of the first element.

13. In a computing machine, racks corresponding to various denominational orders, totalizer wheels carrying gears adapted to mesh with the racks, and means for holding said wheels in mesh therewith while the racks are moving in one direction and transfer devices between the several wheels, additional transfer devices between the racks and means for disabling the transfer devices between the wheels when those between the racks operate.

FREDERICK G. L. BOYER.